3,156,666
COMPATIBLE BLENDS OF OLEFINIC HYDROCARBON POLYMERS, SILICA AND POLYMERS REACTABLE WITH SILICA AND PROCESS FOR FORMING STRUCTURES THEREOF
Richard Dale Pruett, Wilmington, Del., assignor to E. I. du Pont de Nemours and Company, Wilmington, Del., a corporation of Delaware
No Drawing. Filed Feb. 3, 1958, Ser. No. 712,674
7 Claims. (Cl. 260—41)

This invention relates to polymeric shaped structures. More particularly, it relates to the preparation of shaped structures from polymer blends.

Shaped structures formed from individual polymers display both good and poor physical properties. The idea of blending polymers in order to compensate for some of the poor properties of individual constituents and produce shaped structures having superior properties has always intrigued the polymer chemist. However, in most cases the polymeric constituents that would enter the blend are not compatible. It is an object of the present invention to prepare compatible blends of organic, thermoplastic polymers from polymers which are not normally compatible and to provide superior shaped structures from such blends.

"Compatible blends," as used in the present specification, refers to mixtures of polymers which in the molten state are transparent and which may be formed into thin films that are also substantially transparent. "Incompatibility" is indicated when two or more polymers which individually may be formed into substantially transparent films can only be formed into cloudy or milky films when blended.

The invention involves intimately contacting a plurality of saturated, organic, thermoplastic polymers at least one selected from each of the groups, Group A and Group B, with 5–75%, based on the weight of the polymers, of finely divided particles of siliceous material; the particles of siliceous material having their greatest dimension within the range from .001 micron to about .1 micron, having a specific surface area of at least 100 square meters/gram and being characterized by a surface layer of hydroxyl groups; the Group A polymer being characterized by a plurality of side groups attached to carbon atoms along the polymer chain, said carbon atoms being separated by at least one carbon atom in the chain and said side groups being capable of condensation with hydroxyl groups; the Group B polymer being an olefinic hydrocarbon polymer selected from the group consisting of mono-olefins, di-olefins and natural rubber; heating the mixture, while maintaining the components in intimate contact, to a temperature at least equal to the softening temperature of the highest melting polymer component; forming a structure from the flowable mixture; and cooling the formed structure.

The ratio of Group A polymer to Group B polymer in the blend may be anywhere from 20:1 to 1:100. The preferred ratio is about 1:1 to 1:50. The surprising result of the above-described process is that polymers of Group A and polymers of Group B, which are not normally compatible when milled together in molten form, form a compatible blend when processed in accordance with the present invention. Furthermore, the structures formed from the blend display physical properties, e.g., strength, elongation, etc., which represent improvements over those of structures manufactured from the individual polymers.

The formation of cured shaped structures is also within the scope of the present invention. The structures may be cured by any of the well-known techniques, with or without the presence of curing agents. In the presence of curing agents, heat is usually employed and normally, in order to effect curing, the product must be heated to a temperature above that temperature used to blend the polymers and the silica in the previously described process. Consequently, the blend of Group A polymer, Group B polymer and silica may be further heated immediately after formation of the homogeneous blend in order to effect curing prior to actual cooling of the product, or curing may be carried out by heating the resulting shaped structure, such as film, filament, rod, tube, etc., after cooling, to a temperature required to effect a cure. Useful curing agents include compounds capable of generating free radicals, such as benzoyl peroxide, tertiary-butyl perbenzoate, and other types of peroxides. The use of these curing agents which generate free radicals normally effects cross-linking of polymer chains in the form of single bonds between carbon atoms in different chains. Curing agents which actually enter or form the complete link between different chains of the polymer/silica reaction product may also be used. Such curing agents include various isocyanates, such as toluene diisocyanate, and amines, such as triethylene tetramine. The use of other types such as basic oxides, e.g., zinc oxide and the like, is also within the scope of the invention. Curing may also be carried out by subjecting the formed structure to the influence of ionizing radiation. Ionizing radiation includes both particle radiation and ionizing electromagnetic radiation as defined in Industrial and Engineering Chemistry, 45, p. 13A, September 1953.

The process of the invention is essentially a solid state reaction wherein at least one polymer from each of two groups of specific polymeric components is forced to flow around and past particles of certain useful siliceous materials in a shearing type of action. It should be understood that more than two different polymers may be blended in accordance with the present invention, i.e., more than one polymer from Group A may be blended with more than one polymer from Group B. The particles of silica may be added at any convenient time to the blending process. That is, the polymer from Group A may be blended with silica and thereafter, the polymer from Group B may be added; or the Group B polymer may be blended with silica and then the Group A polymer may be added; or the Groups A and B polymers may be blended together and thereafter, the silica may be added to effect the formation of a compatible blend.

In the preferred procedure, from 5% to 75% of silica is milled with the polymers on hot rolls as in a rubber-milling apparatus. The rolls are maintained at or above the softening temperature of the polymer which softens at the highest temperature. The temperature should be sufficiently high to retain the milled mass upon the rolls without excessive adherence of the mass to the rolls. The temperature, however, must be below that causing, in combination with the masticating action of the rubber mill, degradation of the polymer. During milling, the initially cloudy mixture is gradually transformed into a relatively transparent mass. This reaction, which is believed to be a chemical combination of silica and the Group A polymer by linkages resulting from the condensation of the side groups of the Group A polymer with the surface layer of hydroxyl groups of the siliceous particles, is usually accompanied by the evolution of vaporous by-products. The mass is then formed into a sheet or film or other shaped structure by known expedients, such as by calendering or rolling the mass into a sheet or film.

Although the technique of rubber-milling is preferred, other techniques which bring about a similar type of mechanical action upon the mixed masses of the two components may likewise be employed to form a reaction mass which may then be formed into sheets, films, and similar type structures. The initial reactive components may be brought into intimate association in substantially solid form in various types of mixers which exert a masticating type of action upon the mass. A typical type of mixer which may be employed is the Banbury mixer. On the other hand, the initial dispersion of the silica particles into at least the Group A polymer may be brought about by dispersing silica particles in a solution of the polymer or polymers in a solvent. If the dispersion can then be maintained until the solvent is evaporated from the dispersion-solution, a residue of relatively uniformly dispersed silica particles in the polymer is obtained in the form, in most cases, of a powdery material. This material may then be pressed under conditions of super atmospheric pressure and elevated temperatures with the other polymer, if it had not been added previously, to cause considerable flow of the polymeric components and effect more intimate contact between the components. The resulting sheet may be substantially uniform at this stage, or it may be necessary to complete the formation of the sheet by calendering or rolling the sheet at an elevated temperature.

Any other means or technique may be employed to bring about reaction between the subject components of this invention provided that the components are brought together under forces which bring about flow of the polymers, shearing forces between particulate silica and the polymers, and conditions of elevated temperatures and compressive forces. It is believed that the reactive components of this invention must be brought together under these conditions which provide for bringing relatively high concentrations of the individual components into intimate contact.

Polymers of Group A may be selected from the group consisting of (1) saturated, organic, thermoplastic polymers characterized by a plurality of side groups attached to carbon atoms along the polymer chain, said carbon atoms being separated by at least one carbon atom in the chain, said side groups being capable of condensation with hydroxyl groups on the surface of the siliceous particles to effect partial removal of the side groups undergoing said condensation leaving a siloxy group and at least a

between said siloxy group and the polymeric chain (specifically, the side groups are of the formula

wherein R' is a radical selected from the group consisting of alkyl, aryl, aralkyl and substituted alkyl, aryl and aralkyl radicals) and (2) a saturated, organic, thermoplastic polymer characterized by a plurality of side groups directly attached to carbon atoms in the polymer chain, said carbon atoms in the polymer chain being separated by at least two carbon atoms in the chain, said side groups being capable of condensation with hydroxyl groups to effect complete removal of the side groups undergoing said condensation (specifically, the side groups may be selected from the group consisting of —OH,

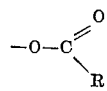

and —SO$_2$X wherein R is selected from the group consisting of alkyl, aryl, aralkyl and substituted alkyl, aryl, and aralkyl radicals and X is a halogen). Preferably, R and R' are alkyl radicals containing up to four carbon atoms. It is also preferred that the remaining valence of each chain carbon atom, to which a reactive side group is attached, be satisfied by a monovalent element such as hydrogen or fluorine.

Group A polymers include from sub-group (1) various polyalkyl acrylates, copolymers of alkyl acrylates with other copolymerizable monomers, various other glycol acrylates such as methyl Cellosolve acrylate and copolymers thereof with other copolymerizable monomers. Specifically, these include copolymers of methyl Cellosolve acrylate/acrylonitrile, copolymers of butyl Cellosolve acrylate/acrylonitrile, and the following copolymers of alkyl acrylates: ethyl acrylate/methyl acrylate/vinyl acetate, ethyl acrylate/2-ethyl hexyl acrylate/acrylonitrile, ethyl acrylate/dimethyl maleate/acrylonitrile, ethyl acrylate/octyldecyl methacrylate/acrylonitrile, ethyl acrylate/acrylonitrile, ethyl acrylate/vinyl chloride, ethyl acrylate/vinylidene chloride, ethyl acrylate/methyl acrylate, methyl acrylate/vinyl acetate, methyl acrylate/ethyl acrylate/acrylonitrile, butyl acrylate/vinylidene chloride, butyl acrylate/vinyl chloride, butyl acrylate/acrylonitrile, butyl acrylate/methyl methacrylate, butyl acrylate/ethyl methacrylate, and copolymers of acrylates with ethylenic hydrocarbons, such as a copolymer of ethylene and methyl or ethyl acrylate, or methyl Cellosolve acrylate.

From sub-group (2), Group A polymers include various modified saturated hydrocarbons as chlorosulfonated polyethylene, copolymers of various ethylenically unsaturated hydrocarbons with copolymerizable compounds having reactive side groups, such as copolymers of ethylene and vinyl acetate, isobutylene and vinyl acetate, ethylene and vinyl salicylate, tetrafluoroethylene and vinyl acetate, and chlorotrifluoroethylene and vinyl acetate, polyvinyl acetals including polyvinyl formal and polyvinyl butyral.

Group B polymers include polyethylene, polypropylene, polyisobutylene, butene-1, pentene-1, polybutadiene, natural rubber, and copolymers of ethylene, propylene, isobutylene, butadiene, butene-1 and pentene-1 with other copolymerizable monomers.

Siliceous particles suitable for use in accordance with the present invention must meet two qualifications. Each particle must have a specific surface area (in relation to its mass) of at least 100 square meters per gram and a surface of silanol groups. The specific surface area of the siliceous particles may be determined by nitrogen adsorption. Since the nitrogen molecule has a diameter of less than 0.5 millimicron, it can penetrate essentially all the pores of siliceous particles useful in this invention, and the nitrogen is readily adsorbed by all of the exposed surfaces. A method for measuring specific surface areas by nitrogen adsorption is given in an article, "A New Method for Measuring Surface Areas of Finely Divided Materials and for Determining the Size of Particles" by P. H. Emmett in the publication "Symposium on New Methods for Particle Size Determination in the Sub-Sieve Range," published by the American Society for Testing Materials, March 4, 1941, page 95. The particulate silica having a silanol surface may be illustrated by the following structural configuration:

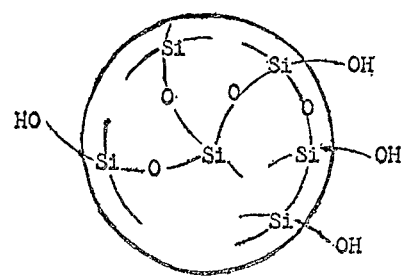

Such silica particles may be referred to in alternative terms: They may be referred to as hydrophilic silica, meaning that the material is wetted by water. On the other hand, the silica having a silanol surface, i.e., covered with a monolayer of hydroxyl groups, may be referred to as hydrated silica or a hydrated solid silicic acid or polysilicic acid, the monolayer of hydroxyl groups being called "bound water." According to Ralph K. Iler, in "The Colloid Chemistry of Silica and Silicates"

(published 1955), when this type of silica is "heated to 500° C.–600° C., this layer (the monolayer of hydroxyl groups) is partly removed without sintering the silica; part of the surface is left in a dehydrated oxide condition which will not physically adsorb water or methyl red dye (as does the hydroxylated surface), but which can be slowly rehydrated upon exposure to water." Furthermore, Iler states that:

"(1) Physically adsorbed water is removed by drying to constant rate at 115° C.

"(2) Water remaining on silica gel at 115° C. is present as a layer of hydroxyl groups on the silica surface; this 'bound water' content is proportional to the surface area of the gel.

"(3) Water evolved between 115° C. and about 600° C. comes from dehydration of the surface hydroxyl groups, without appreciable loss in area of the silica surface.

"(4) Above 600° C. there is sintering with loss of silica surface and simultaneous loss of water, but the number of remaining hydroxyl groups per unit area remains constant."

The siliceous particles employed in forming the present products must be relatively non-porous unless the porosity of particles to be reacted with polymer is due to a state of aggregation which can be broken down during the process of this invention to form discrete silica particles having a surface area of at least 100 square meters per gram. The particle size (size of the greatest dimension of a particle or the diameter in the case of spherical particles) of discrete, substantially non-porous silica particles is usually within the range from 0.001 micron to about 0.1 micron. Aggregates, which break down during the process of this invention, may be as large as 1 micron or greater.

The particles may be naturally formed or synthetically prepared in accordance with a variety of known techniques. The material may be entirely amorphous or contain a crystalline component. Although the preferred siliceous material is wholly amorphous falling within the class of materials known as colloidal silicas, the individual particles may be aggregates of discrete colloidal particles. In the case of dry colloidal particles of silica containing silanol surfaces, aggregation apparently always occurs owing to the spontaneous attraction between very small particles. According to Iler, "The main problem in making a useful finely divided silica is to prevent the formation of such strong and compact aggregates that the individual or ultimate particles cannot later be separated." Hence, during the processes of intimately associating (by mechanical means) the polymer and the preferred types of silica, the supercolloidal aggregates break down into particles of colloidal size.

The following techniques are most useful for preparing siliceous particles for use in the present invention:

(1) A silica aerogel may be formed by gelling silicic acid in an alcohol-water solution and then converting the gel to an aerogel. This may be carried out by replacing most of the water of the gel with alcohol, heating the gel in an autoclave above the critical temperature of alcohol so that there is no meniscus between the liquid and gas phases and venting the vapors. In this way, the liquid is removed without subjecting the gelled structure to the compressive forces due to the surface tension of the liquid-gas interface. A pulverized light fluffy powder of silica particles may then be formed by pulverizing the dry aerogel.

(2) Colloidal silicas may be prepared by vaporizing silicon dioxide at high temperatures or producing silicon vapor by burning ethyl silicate or silicon tetrachloride and thereafter collecting the "silica fume."

(3) Still another technique of preparing colloidal silicas is to precipitate silica from aqueous solution in such form that it can be dried to give a fine powder.

It should be mentioned that it is difficult, if not impossible, in most cases, to reduce by mechanical means the particle size of hard naturally-occurring silicas, such as sand, to form smaller particles of satisfactory specific surface area.

The names and sources of various types of available siliceous particles are specified in the following table, Table 1.

TABLE 1

| Name | Manufacturer | Ultimate Particle Size (microns) | Specific Surface Area (m.²/g.) |
| --- | --- | --- | --- |
| "Hi-Sil" | Columbia-Southern Co. | 0.025 | 110 |
| Aerosil | Dow-Corning Corp. | 0.004–0.020 | 300–350 |
| Aerosil | Godfrey L. Cabot, Inc. | 0.015–0.020 | 175–200 |
| "Syloid" 244 | Davison Chemical Co. | (1) | 290 |
| "Cab-O-Sil" | Godfrey L. Cabot, Inc. | 0.015–0.022 | 175–200 |

[1] Aggregates break down to form ultimate particles having a specific surface area of about 290 m.²/g. or greater.

The following specific examples further illustrate the principles and practice of the invention. Parts and percentages are by weight unless otherwise indicated. In these examples, films, sheets and the like were prepared and some of their important properties were determined. The properties were measured in accordance with the following procedures:

*Tensile strength.*—The tensile strength of the film structures is presented in pounds per square inch, being based upon the initial cross-sectional area of the sample. It is determined by elongating the film sample at a rate of 100% per minute until the film sample breaks. The tensile strength at break is the value used.

*Elongation.*—The value of elongation represents the extent to which the film is extended at breakage. Elongation is effected at the rate of 100% per minute.

*Initial tensile modulus.*—Initial tensile modulus in pounds per square inch is a measure of film stiffness, i.e., the higher the modulus, the greater the stiffness. Modulus is taken from the slope of the initial or Hookian portion of the stress-strain curve at 1% elongation, the film being elongated at the rate of 100% per minute.

*Tear strength.*—The specimens used in this test are 2" x 2½". An initial cut of 1" in length is made in the lengthwise direction. The specimen is placed between jaws which separate at the rate of 10"/minute. The maximum force required to continue the above initial tear for an additional 1½" is recorded. This maximum force is then divided by the sample thickness to give tear strength in grams/mil.

*Zero strength temperature.*—The zero strength temperature is that temperature at which a film supports a load of 20 lbs./sq. inch per film cross-sectional area for no more or less than 5±0.4 seconds. The test is carried out by placing the sample in contact with a heated bar, the proper load being previously applied, and determining the length of time required for failure. This is carried out at various temperatures until the zero strength temprature is determined.

*Printability.*—"Excellobrite" white ink (W–500), manufactured by Bensing Bros. & Deeney, is applied to the film surface with a commercial ink spreader. The spreader comprises a steel rod having fine wires wrapped around the rod. The spreader produces a multiplicity of fine lines. The ink is dried for about 3 minutes at 30° C. and thereafter, is permitted to cool to room temperature. The adhesion between the printing ink and the film surface is then tested by applying a strip of a pressure-sensitive tape upon the printed film surface and pressing the tape firmly into contact with the film surface. The tape is then stripped off rapidly from the film surface. If little or no ink is removed from the film surface, the film is classed as printable and designated "yes." If an appreciable amount of ink is removed from the film surface, the film is classed as not printable and designated "no."

*Example I*

Fifty parts of an ethylene/vinyl acetate copolymer (4/1 mol ratio), 50 parts of polyisobutylene and about 82 parts of a particulate silica ("Cab-O-Sil") were milled together on a rubber mill having steam-heated rolls heated to a temperature of 130°–140° C. The individual polymers were first added to the stainless steel rolls and then the silica particles were fed in slowly. The total milling time was 7–20 minutes. A homogeneous blend containing 27.5% of each of the polymers and 45% of the silica was obtained. The blend was hot-pressed between ferrotype plates at a temperature of 120° C. for about ten minutes. The resulting film, while still under pressure, was cooled to room temperature and removed from the plates. The film was transparent.

As a control, Example I was repeated except that the silica was omitted. A blend of 50% of the ethylene/vinyl acetate copolymer and 50% of the polyisobutylene was used. The resulting film was milky and opaque. The physical properties of both films are compared in Table 2.

TABLE 2

| Example | Initial Tensile Modulus (p.s.i.) | Tensile Strength (p.s.i.) | Tear Strength (g./mil) |
|---|---|---|---|
| I | 9,700 | 1,000 | 162 |
| Control | 285 | 440 | 45 |

*Example II*

Equal parts of n-butyl acrylate polymer and polyethylene were milled on a rubber mill at a temperature of 110°–120° C. in accordance with the procedure described in Example I. Particulate silica ("Cab-O-Sil") was added as in Example I to form a homogenous transparent blend containing 27.5% of each of the polymers and 45% of the silica. The blend was hot-pressed at 110°–120° C., then cooled to form a transparent film.

As a control, Example II was repeated using 50% n-butyl acrylate and 50% polythylene and no silica. A milky, non-transparent film was formed. The physical properties of both films are compared in Table 3.

TABLE 3

| Example | Initial Tensile Modulus (p.s.i.) | Tensile Strength (p.s.i.) | Elongation (Percent) |
|---|---|---|---|
| II | 25,850 | 2,525 | 100 |
| Control | 4,600 | 240 | 18 |

*Examples III–VI*

In these examples various weight ratios of polyethyl acrylate to polyethylene as shown in Table 4 were milled together on a hot rubber mill maintained at a temperature of about 90° C. Particulate silica ("Cab-O-Sil") was added slowly as in Example I in the amounts (30% or 40% based on the weight of the polymers) indicated in Table 4.

The rubber-milled blends were formed into films by mill rolling. Squares were cut from the thick sheet obtained from the rubber mill. The squares were then passed through the reduced nip of rolls several times to obtain films of the desired thickness. The rolls were maintained at a temperature of 90°–100° C. and all operated at substantially the same peripheral speed. The films produced were clear, transparent, flexible and permeable to water vapor. The properties are given in Table 4.

No control is presented since attempts to blend the two polymers in the absence of silica were unsuccessful. The two polymers would not mix—one polymer followed one roll of the rubber mill; the other polymer followed the other roll.

TABLE 4

| Example | Wt. ratio PEA:[1] PE[2] | Percent Silica | Thickness (mils) | Tear Strength (g./mil) |
|---|---|---|---|---|
| III | 5:1 | 30 | 11 | |
| IV | 1:4 | 30 | 8 | |
| V | 3:1 | 40 | 6 | 387 |
| VI | 2:1 | 40 | 7 | 187 |

| Example | Tensile Strength (p.s.i.) | Elongation (percent) | Initial Tensile Modulus (p.s.i.) | Zero Strength Temp. (° C.) |
|---|---|---|---|---|
| III | 2,760 | 205 | 48,500 | 170 |
| IV | 2,410 | 323 | 24,600 | |
| V | 2,055 | 88 | 14,100 | 300 |
| VI | 2,200 | 147 | 26,500 | 309 |

[1] Polyethyl acrylate.
[2] Polyethylene.

*Examples VII–X*

In these examples various weight ratios of a copolymer of ethyl acrylate/acrylonitrile (4/1 mol ratio)-to-polyethylene along with various amounts of particulate silica ("Cab-O-Sil") were used to prepare films as in Examples III–VI. The rubber mill was operated at a temperature of about 90° C. and the mill rolls were maintained at a temperature of 90° 100° C.

The properties of the resulting transparent films are presented in Table 5. Again, no control is presented since it was not possible to form a film from mixtures of the two polymers in the absence of silica.

TABLE 5

| Example | Weight Ratio P(EA–AN):[1] PE[2] | Percent Silica | Thickness (mils) |
|---|---|---|---|
| VII | 3:1 | 30 | 10 |
| VIII | 1:1 | 30 | 9 |
| IX | 1:3 | 30 | 4 |
| X | 1:3 | 40 | 4 |

| Example | Tensile Strength (p.s.i.) | Elongation (percent) | Initial Tensile Modulus (p.s.i.) | Zero Strength Temp. (° C.) |
|---|---|---|---|---|
| VII | 3,320 | 215 | 57,400 | 150 |
| VIII | 4,250 | 177 | 47,000 | 225 |
| IX | 3,826 | 60 | 44,000 | 130 |
| X | 4,182 | 48 | 55,100 | >300 |

[1] Copolymer of ethyl acrylate/acrylonitrile (4/1 mol ratio).
[2] Polyethylene.

*Example XI*

Equal parts of polypropylene and polymethyl acrylate were rubber-milled together in the presence of 35% particulate silica ("Cab-O-Sil") based on the total weight of the polymers as in the previous examples, at a temperature of 105° C. for 10 minutes. A transparent film was formed directly from the blend by decreasing the clearance between the rubber mill rolls.

As a control, equal parts of polypropylene and polymethyl acrylate were rubber-milled together at a temperature of 105° C. for about 10 minutes with no added silica. The resulting film was milky, generally opaque and non-homogeneous. The physical properties of both films are compared in Table 6.

TABLE 6

| Example | Thickness (mils) | Tensile Strength (p.s.i.) | Elongation (percent) |
| --- | --- | --- | --- |
| XI | 10 | 830 | 40 |
| Control | 10 | 360 | 140 |

| Example | Initial Tensile Modulus (p.s.i.) | Tear Strength (g./mil) | Zero Strength Temp. (° C.) |
| --- | --- | --- | --- |
| XI | 27,500 | 15 | 175 |
| Control | 3,350 | 51 | 140 |

*Examples XII–XIII*

In Example XII, equal parts of a natural rubber and polymethyl acrylate were rubber-milled together in the presence of 35% "Cab-O-Sil" as in previous examples, for 20 minutes at a temperature of about 50° C. A transparent film was then formed from this polymeric blend by mill rolling as in Example III.

In Example XIII, equal parts of polymethyl acrylate and natural rubber were blended together on a rubber mill at 50° C. for 20 minutes. Thereafter, "Cab-O-Sil" particulate silica (35% by weight based on the polymeric components) was added along with 1% by weight of butylated hydroxy toluene, and the mixture was milled at 100° C. Then the following materials were added to the blend and rubber milling was continued for a short duration:

(All percentages are by weight, based upon the total weight of polymer.)

1% tetraethyl thiuram disulfide
5% zinc oxide
2.5% sulfur

A film was formed from this blend by mill rolling, and thereafter, the film was cured by subjecting it to a temperature of 150° C. for 30 minutes.

The physical properties of both the uncured (Example XII) and the cured (Example XIII) films are given in Table 7.

TABLE 7

| Example | Thickness (mils) | Tensile Strength (p.s.i.) | Elongation (percent) |
| --- | --- | --- | --- |
| XII | 15 | 800 | 500 |
| XIII | 15 | 1,400 | 500 |

| Example | Initial Tensile Modulus (p.s.i.) | Tear Strength (g./mil) | Zero Strength Temp. (° C.) |
| --- | --- | --- | --- |
| XII | 18,600 | 106 | 235 |
| XIII | 28,300 | 26 | >300 |

*Examples XIV–XVI*

A copolymer of ethylene/vinyl acetate (4/1 mol ratio) and polyethylene were rubber-milled together for 10–20 minutes in the presence of particulate silica ("Cab-O-Sil") at a temperature of about 110 C. as in previous examples. Film was formed form the compatible blend by mill-rolling the blend at a temperature of 60° C. Various weight ratios of the polymers and varying amounts of silica were used as indicated in Table 8. The films formed from the blends were homogeneous and as clear as a film formed from polyethylene alone.

As controls, films were prepared without using any silica: Control A comprising a film of polyethylene alone; Control B comprising a film of the ethylene/vinyl acetate copolymer alone; and Control C comprising a film formed from a blend (1:1 weight ratio) of the two polymers. The Control C film was a milky, generally opaque and non-homogeneous film. All the films were tested for printability and the results are presented in Table 8.

TABLE 8

| Example | Weight Ratio E/VA:[1] PE [2] | Percent Silica | Printability |
| --- | --- | --- | --- |
| XIV | 1:3.5 | 10 | Yes. |
| XV | 1:3.2 | 15 | Yes. |
| XVI | 1:3 | 20 | Yes. |
| Control A | 0:1 | 0 | No. |
| Control B | 1:0 | 0 | Yes. |
| Control C | 1:1 | 0 | No. |

[1] Ethylene/vinyl acetate copolymer.
[2] Polyethylene.

The present process is highly versatile in that the products may be tailored to specific end uses by varying the amount and the type of particulate silica in the blend of polymers/silica system. In general, the overall useful range of silica concentration extends from about 5% to 75%; and for many types of end uses the preferred amount of silica is from 5% to 50%. When polymer blends within the scope of the present invention are combined with silica, the range of physical properties of the resulting products in film form vary within wide limits. The softer the initial polymers, the softer will be the products; and in the case of reacting initially stiffer polymers with silica, the resulting products will be relatively stiff. For special end uses, the properties of the products of this invention may be made more adaptable by stretching or drawing them in one or two directions.

The essential advantage of the present invention is that it permits the preparation of new compatible blends of polymers (novel in the sense that compatible blends could not be prepared heretofore). It is believed that the following mechanism operates to overcome the incompatibility of the Group A polymer and the Group B polymer. The Group A polymer, as defined, is reactive with particulate silica. The addition of the particulate silica to the mixture of the two polymers under the prescribed conditions serves to initiate the reaction between the Group A polymer and silica. At the same time, it is theorized, the Group B polymer, heretofore incompatible with the Group A polymer, becomes locked into the Group A polymer-silica reaction product. This "locking-in" serves to make the polymers compatible. The described mechanism represents a theory and should in no way be construed to limit the present invention.

The compatible blends can be formed into sheets, films, filaments, rods, tubes, coatings or similar formed structures having unique and highly useful combinations of physical properties. The variety of formed structures which may be fabricated from the novel blends of this invention are useful in a myriad of applications. They can be used as fabric replacement films in upholstery applications, as shower curtains, draperies, tablecloths, wall coverings, furniture covers, card table covers, wearing apparel such as rainwear, baby pants and other nursery goods, suit linings, yard goods, aprons, in the form of tapes for bandage material, in the preparation of inflatable toys, and garment bags, tarpaulins, luggage covers, handbags and the like. They may also be used for floor tiles, shoe soles, shoe heels, etc. Luminescent pigments such as barium, calcium and strontium sulfides may be readily incorporated into the products of this invention and the resulting products formed into luminescent sheets, films and the like for use in wearing apparel, policemen's capes, for decorative applications and the like.

What is claimed is:

1. A shaped structure formed from a homogeneous compatible blend of a saturated organic thermoplastic copolymer of ethylene and vinyl acetate, at least one olefinic hydrocarbon polymer selected from the group consisting of polymers of mono-olefins and di-olefins and 5–75%, based on the weight of said polymers of finely divided particles of silica, said particles of silica having their greatest dimension within the range from .001 micron to about .1 micron, having a specific surface area of at least 100 square meters/gram and being characterized by a surface layer of hydroxyl groups.

2. A process comprising mixing a copolymer of ethylene and vinyl acetate with at least one olefinic hydrocarbon polymer selected from the group consisting of polymers of mono-olefins and di-olefins in the presence of 5–75%, based on the weight of the polymers, of finely divided particles of silica to form a mixture, said particles of silica having their greatest dimension within the range from .001 micron to about .1 micron, having a specific surface area of at least 100 square meters/gram and being characterized by a surface layer of hydroxyl groups; heating the mixture while maintaining the components in intimate contact to a temperature at least equal to the softening temperature of the highest melting polymer component; forming a structure from the flowable mixture and cooling the formed structure.

3. A shaped structure as in claim 1 wherein the olefinic hydrocarbon polymer is polyisobutylene.

4. A shaped structure as in claim 1 wherein the olefinic hydrocarbon polymer is polypropylene.

5. A process as in claim 2 wherein mixing is effected by rubber milling.

6. A shaped structure formed from a homogeneous compatible blend of a saturated organic thermoplastic copolymer of ethylene and vinyl acetate, polyethylene and 5–75%, based on the weight of said polymers, of finely divided particles of silica, said particles of silica having their greatest dimension within the range from .001 micron to about .1 micron, having a specific surface area of at least 100 square meters/gram and being characterized by a surface layer of hydroxyl groups.

7. A process comprising mixing a copolymer of ethylene and vinyl acetate with polyethylene in the presence of 5–75%, based on the weight of the polymers, of finely divided particles of silica to form a mixture, said particles of silica having their greatest dimension within the range from .001 micron to about .1 micron, having a specific surface area of at least 100 square meters/gram and being characterized by a surface layer of hydroxyl groups; heating the mixture to a temperature of at least 90° C.; forming a structure from the flowable mixture and cooling the formed structure.

References Cited in the file of this patent

UNITED STATES PATENTS

| | | |
|---|---|---|
| 2,517,014 | Miller et al. | Aug. 1, 1950 |
| 2,611,153 | Semegen | Sept. 23, 1952 |
| 2,728,740 | Iler | Dec. 27, 1955 |
| 2,857,355 | Iler | Oct. 21, 1958 |
| 2,879,244 | Coler | Mar. 24, 1959 |
| 2,888,424 | Precopio et al. | May 26, 1959 |